C. S. BIRD & G. R. WYMAN.
PROCESS OF MAKING PAPER BOARD.
APPLICATION FILED JULY 11, 1913.
1,216,055. Patented Feb. 13, 1917.
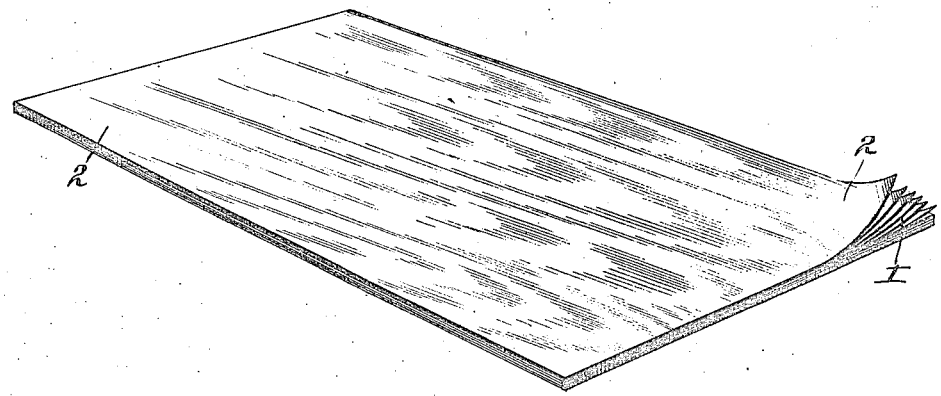
Witnesses:
Inventors.
Charles S. Bird
George R. Wyman,
By Dodge and Sons,
Attorneys.

UNITED STATES PATENT OFFICE.

CHARLES S. BIRD AND GEORGE R. WYMAN, OF WALPOLE, MASSACHUSETTS; SAID WYMAN ASSIGNOR TO SAID BIRD.

PROCESS OF MAKING PAPER-BOARD.

1,216,055.          Specification of Letters Patent.          Patented Feb. 13, 1917.

Original application filed July 5, 1912, Serial No. 707,835. Divided and this application filed July 11, 1913. Serial No. 778,514.

*To all whom it may concern:*

Be it known that we, CHARLES S. BIRD and GEORGE R. WYMAN, citizens of the United States, residing at Walpole, in the county of Norfolk and State of Massachusetts, have invented certain new and useful Improvements in Processes of Making Paper-Board, of which the following is a specification.

Our present invention pertains to an improved process of making paper board.

Paper-board has of recent years come into somewhat extended use and its field of application is widening, this primarily by reason of the fact that lumber is becoming more and more expensive, and for the further reason that the manufacturers of such board are producing a better article than formerly. There is present, however, in the usual commercial paper-board of today one inherent defect which renders it unsatisfactory for many purposes, namely, the tendency to warp and buckle prior to or after it is positioned.

The main object of the present invention is to produce a board which will maintain its evenness and present a smooth surface or face, particularly so after it is fastened in place. This is accomplished primarily by charging the board, during its process of manufacture, with an appreciable amount of moisture, which moisture is, after being applied, slowly given off during a considerable period of time. Thus, when the board, with a certain percentage of contained moisture, is secured in place around its edges, by tacking it, which is the usual manner of fastening the same, it becomes taut and maintains such position or condition indefinitely.

A piece of board manufactured in accordance with our invention is sought to be shown in the annexed drawing, wherein it appears in perspective, with the various plies separated at one corner to show that the structure is a laminated one.

In carrying out the process of manufacture, we take a number of plies of paper as 1 and apply a suitable adhesive thereto, except, of course, the outer faces of the outer plies, and bring the same together under pressure through the agency of any suitable means. The adhesive which is employed, such as glue, silicate of soda, or the like, will have present a greater amount of moisture than is necessary to ordinarily effect a cementation of the layers. Such excess of moisture (from 5 to 10 per cent., by weight), is taken up by the paper-stock and is retained therein, for when the board passes from the pressure rolls, which are used in the formation thereof it is treated upon its outer faces with a suitable water-repellent substance, such as paraffin wax, gum, or any quick-drying agent, either heated or dissolved in a volatile solvent. If desired, one or both faces may be passed beneath an engraved roll, to print thereon any desired design, such, for instance as an imitation wood-grain, as shown upon the outer ply 2, such printing, of course, being effected prior to the application of the waterproofing material. Such surface ornamentation may be applied to the outer plies prior to the formation of the board and, furthermore, such plies may be of a better grade of stock than the others, in order to produce a better finish.

Instead of applying to or charging the stock with the excess moisture through the medium of the adhesive, the plies may be damped by passing the same over a roll, covered or plain, to which water is supplied in any suitable manner. It is even conceivable that the plies might be sprayed, though the application of the moisture through the adhesive as a carrying medium is preferred, and is found to produce an article having the characteristics desired.

Board manufactured as above outlined, gives highly satisfactory results, and does not warp or buckle. It is assumed that as the fibers are slightly distended or swollen as the board is produced they naturally shrink or shorten up in time, and consequently, tend to cause the positioned sheet, usually fastened around the edges, to become taut. Furthermore, there is little or no tendency for the board to absorb moisture, for the reason that it is already impregnated with an amount of moisture greater than that normally contained in the atmosphere, and for the further reason that the waterproofing material applied to the outer surfaces tends to prevent such absorption.

It is most important to note that such waterproofing material tends to hold the contained moisture within the board and thus the evaporation of the contained moisture takes place but slowly.

It has been found from experience that board thus made will stand shipment and storage for a considerable period of time, and yet not lose sufficient moisture to prevent it from tightening up or becoming taut when finally secured in place.

Where the board is used as a finishing strip, that is, in a narrow piece which is adapted to overlie the adjacent edges of two sheets, as in panel-work, the edges of the strip are somewhat condensed and burnished down by the cutters and such edges are waterproofed along with the faces of the strip.

No claim is made to the board produced by the above process as that forms the subject matter of our application filed on or about July 5, 1912, Serial No. 707,835, now Letters Patent No. 1,074,829, dated October 8, 1913, of which this is a division.

Having thus described our invention, what we claim is:—

1. The process of producing a substantially rigid, non-warping paper-board, which consists in securing a plurality of plies of paper together with an adhesive and likewise charging the fibers of the stock with water in a quantity sufficient to cause the fibers to appreciably swell and to so remain; and finally waterproofing the outer faces of the board while the moisture is still contained therein and thereby imprisoning the moisture.

2. The process of producing a substantially rigid, non-warping paper-board, which consists in securing a plurality of plies of paper together with an adhesive containing or carrying moisture over that necessary to render the adhesive effective and in a quantity sufficient to dampen and swell the fibers of the plies; and thereafter, while the moisture is still contained in the swollen fibers, treating the exterior of the board with a waterproofing compound and thereby imprisoning the moisture.

3. The process of producing a substantially rigid, non-warping paper-board, which consists in pressing and securing together a plurality of plies of paper, the fibers of which are dampened and swelled; and finally, while the moisture is still contained in the swollen fibers, coating the exterior faces of the board with a waterproofing compound and thereby imprisoning the moisture and maintaining the fibers in their swollen condition.

In testimony whereof we have signed our names to this specification in the presence of two subscribing witnesses.

CHARLES S. BIRD.
GEORGE R. WYMAN.

Witnesses:
H. H. MILLER,
M. M. RINES.